United States Patent
Kurokawa

(10) Patent No.: US 7,306,019 B2
(45) Date of Patent: Dec. 11, 2007

(54) PNEUMATIC TIRE INCLUDING TORIODALLY CONTINUOUS CELLS AND METHOD OF PRODUCING SAME

(75) Inventor: Makoto Kurokawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 170 days.

(21) Appl. No.: 10/490,938

(22) PCT Filed: Sep. 27, 2002

(86) PCT No.: PCT/JP02/10070

§ 371 (c)(1),
(2), (4) Date: Mar. 26, 2004

(87) PCT Pub. No.: WO03/029342

PCT Pub. Date: Apr. 10, 2003

(65) Prior Publication Data

US 2005/0000614 A1 Jan. 6, 2005

(30) Foreign Application Priority Data

Sep. 28, 2001 (JP) .............................. 2001-303729

(51) Int. Cl.
*B29D 30/58* (2006.01)
*B29D 30/60* (2006.01)
*B60C 1/00* (2006.01)
*B60C 11/00* (2006.01)
*B60C 11/12* (2006.01)

(52) U.S. Cl. .............................. 152/209.7; 152/209.17; 152/209.18; 152/339.1; 152/DIG. 3; 156/117; 156/128.1; 156/130; 428/313.5; 428/314.8

(58) Field of Classification Search ................ 156/117, 156/128.1, 130; 152/209.7, 209.17, 339.1, 152/340.1, 209.18, DIG. 3; 428/313.5, 314.8, 428/314.2, 319.3
See application file for complete search history.

(56) References Cited

U.S. PATENT DOCUMENTS 642,776 A * 2/1900 Anderson ................ 152/339.1
2,143,528 A * 1/1939 Thomas ................ 152/209.17
2,716,435 A * 8/1955 Herzegh ................ 152/DIG. 3

(Continued)

FOREIGN PATENT DOCUMENTS

EP 0826522 A1 3/1998

(Continued)

*Primary Examiner*—Steven D. Maki
(74) *Attorney, Agent, or Firm*—Sughrue Mion, PLLC

(57) ABSTRACT

A rubber composition is provided with a large friction force even on a body having, for example, an ice face of a low friction coefficient. The composition is constituted by a foamed rubber having a rationalized foaming state. The composition is applied to an upper-layer rubber part of a tread rubber constituting at least a ground contact face to enhance a gripping force on a frozen road surface or a snow covered road surface. The foamed rubber has continuous cells 6 each continuously extending substantially along a particular direction 4 and sealed with a resin protection membrane 5. Also, a method is provided for producing such a tire.

15 Claims, 11 Drawing Sheets

U.S. PATENT DOCUMENTS

| | | | |
|---|---|---|---|
| 3,223,572 A * | 12/1965 | Holloway et al. | 156/130 |
| 3,467,063 A * | 9/1969 | Brinkley et al. | 118/314 |
| 3,607,497 A * | 9/1971 | Chrobak | 156/117 |
| 5,387,303 A * | 2/1995 | Azuma | 156/179 |
| 6,039,826 A * | 3/2000 | Okada | 156/117 |
| 6,336,487 B1 | 1/2002 | Teratani et al. | |
| 6,427,738 B1 * | 8/2002 | Fujino et al. | 152/209.7 |
| 6,497,261 B1 * | 12/2002 | Fukushima et al. | 152/209.7 |
| 2001/0035255 A1 * | 11/2001 | Sergel et al. | 156/130 |
| 2002/0084016 A1 * | 7/2002 | Tanaka | 156/121 |

FOREIGN PATENT DOCUMENTS

| | | | |
|---|---|---|---|
| JP | 3-197121 | * | 8/1991 |
| JP | 7-81316 | * | 3/1995 |
| JP | 11-48264 | * | 2/1999 |
| JP | 11-60811 | * | 3/1999 |
| JP | 2000-15717 | * | 1/2000 |
| JP | 2000-62043 | * | 2/2000 |
| JP | 2000-108222 | * | 4/2000 |
| JP | 2001-130222 | * | 5/2001 |
| WO | WO 97/34776 | * | 9/1997 |

* cited by examiner

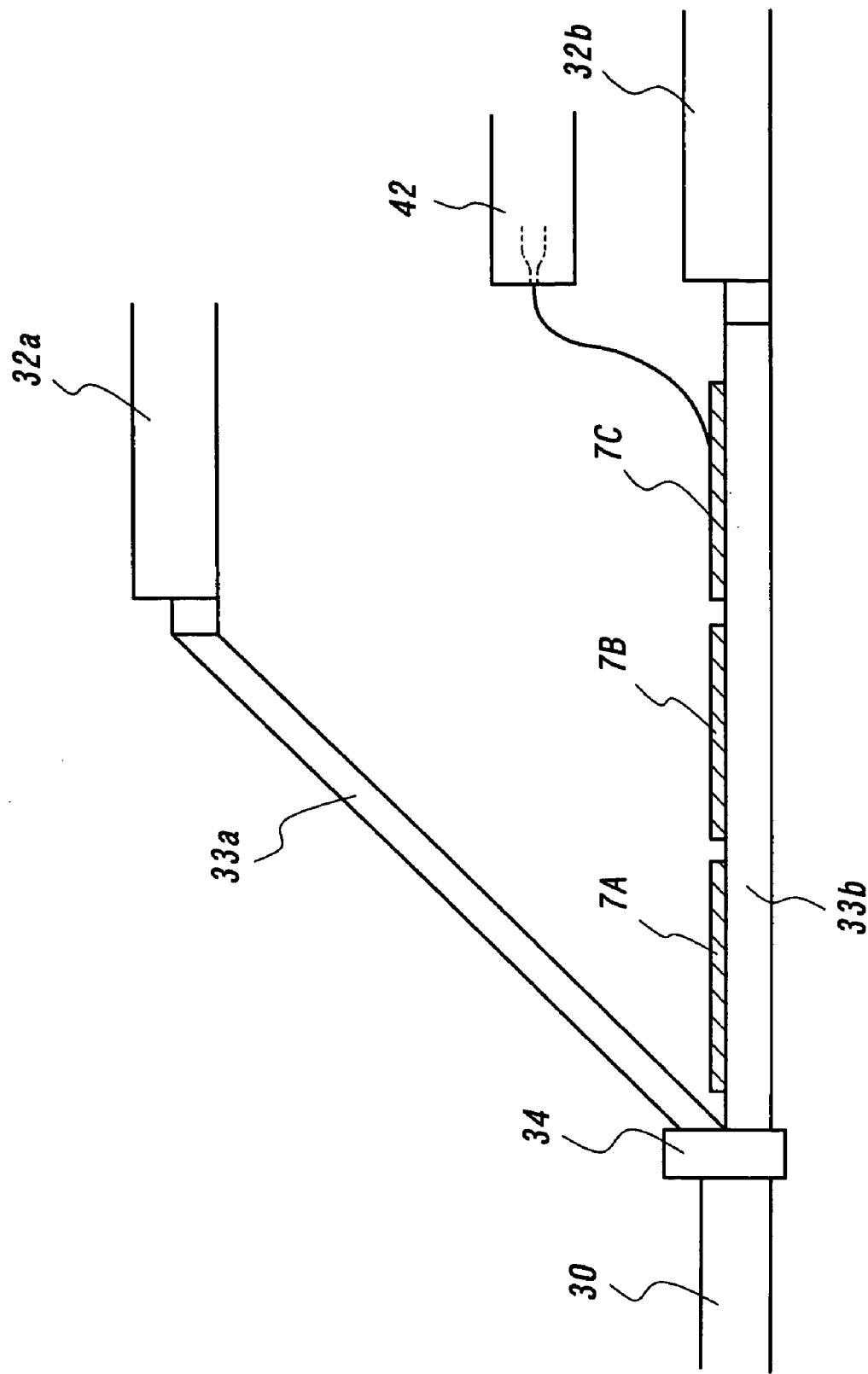

PNEUMATIC TIRE INCLUDING TORIODALLY CONTINUOUS CELLS AND METHOD OF PRODUCING SAME

TECHNICAL FIELD

This invention relates to a rubber composition of a foamed rubber providing a large friction force even on a body having, for example, an ice face of a low friction coefficient, and a pneumatic tire having improved steering stability performances such as braking performance, cornering performance and the like by applying this rubber composition to an upper-layer rubber part of a tread rubber constituting at least a ground contact face to enhance a gripping force on a frozen road surface or a snow covered road surface, particularly a winter-seasoned tire such as a studless tire or the like as well as a method of producing such a tire.

BACKGROUND ART

In the conventional pneumatic tires, particularly winter-seasoned tires such as studless tire or the like, there are proposed various methods for ensuring performances on ice or performances on snow.

As a way for increasing a friction coefficient on an ice-snow road surface, it is useful to microscopically form grooves by using a short fiber-containing foamed rubber as a tread rubber and breaking away the short fibers exposed on a surface of the tread accompanied with the wearing of the tread rubber during the running as described in JP-A-4-38207.

However, the microscopic grooves formed on the tread are liable to be crushed as a load applied to the tire becomes large, and hence the effect of increasing the friction coefficient on the ice-snow road surface can not be sufficiently obtained.

Also, it is necessary that the short fibers are embedded in the foamed rubber at a state of extending in a straight line and substantially in parallel to a worn face of the tread when the tread is worn by the running for rapidly breaking away the short fibers exposed on the worn face of the tread to microscopically form the grooves.

However, the short fibers are actually and frequently embedded in the foamed rubber at a state of being curled through heat shrinkage in the vulcanization or pushing the fibers into a groove portion of a mold part or a sipe portion to bend in the tread rubber. In this case, even if the tread worn during the running, the short fibers not extending substantially in parallel to the worn face of the tread can not easily be broken away from the foamed rubber, so that the microscopic grooves as originally intended can not be formed efficiently.

As another way for ensuring the performances on ice or performances on snow, it is useful to use a foamed rubber containing spherical closed cells in the tread as described in JP-A-62-283001.

That is, ice or snow on the ice-snow road surface is thawed to water by friction heat when the tire tread contacts with the ice-snow road surface and this water forms a water membrane between the tread and the ice-snow road surface, and the performances on ice or performances on snow are deteriorated by this water membrane. In case of the tire using the above foamed rubber, the water membrane can be removed by the action of irregularities on the tread formed by the closed cells, and hence it is attempted to improve the performances on ice or the performances on snow.

However, the tire described in JP-A-62-283001 does not develop the sufficient water-removing effect because the irregularities formed on the tread by the closed cell are very fine.

For this end, the applicant has made studies for enhancing the water removing effect on the ice-snow road surface and found that the water removing effect on the ice-snow road surface is conspicuous in pneumatic tires provided with a tread having not only the spherical closed cells but also many continuous closed cells covered with a protection layer of a resin, which has been proposed by an Application No. JP9700873 of an international application under PCT (international publication No. 9734776).

In such a tire, it is considered that drainage paths can be particularly formed by the continuous closed cells, whereby the water removing effect is enhanced.

However, the applicant has made further studies in order to more enhance the water removing effect on the ice-snow road surface and revealed that there is room for improvement because it is hardly said that the sufficient drainage paths are formed in the tire as the length of the continuous closed cell is shorter than an arranging pitch of sipe or groove disposed on the tread.

DISCLOSURE OF THE INVENTION

It is an object of the invention to provide a rubber composition giving a large friction force on a body having, for example, an ice face of a low friction coefficient by constituting with a foamed rubber having a rationalized cell-existing state, and a pneumatic tire having improved steering stability performances such as braking performance, cornering performance and the like by applying this rubber composition to at least an upper-layer rubber part of a tread rubber constituting a ground contact face to enhance a gripping force on a frozen road surface or a snow covered road surface, particularly a winter-seasoned tire such as a studless tire or the like as well as a method of producing such a tire.

In order to achieve the above object, the first invention is a rubber composition constituted with a foamed rubber, characterized in that the foamed rubber has continuous cells each continuously extending substantially along a particular direction and sealed with a resin protection membrane.

Also, it is preferable that the foamed rubber comprises resin cords continuously extending in a thready form along a particular direction before vulcanization and a foaming agent, in which the resin cord is melted in the vulcanization to develop a viscosity lower than that of rubber constituting the foamed rubber and the foaming agent has a property of foaming in the vulcanization to produce gases, and the continuous cell is formed by sealing at least a part of gases produced from the foaming agent with the resin protection membrane made of the resin cord.

The second invention is a pneumatic tire comprising a tread rubber, at least an upper-layer rubber part of which forming a ground contact face being made of a foamed rubber, characterized in that the upper-layer rubber part has toroidally continuous cells each continuously extending substantially along a circumferential direction of the tire and sealed with a resin protection membrane.

It is preferable that the foamed rubber comprises resin cords each continuously extending in a thready form along the circumferential direction of the tire before vulcanization and a foaming agent, in which the resin cord is melted in the vulcanization to develop a viscosity lower than that of rubber constituting the upper-layer rubber part and the foaming agent has a property of foaming in the vulcanization to produce gases, and the continuous cell is formed by sealing at least a part of gases produced from the foaming agent with the resin protection membrane made of the resin cord. Also, it is preferable that the continuous cells are arranged at plural stages in a thickness direction of the tread.

The resin cord is preferable to have a cord diameter of 10-100 μm and/or to have a melting point lower than a maximum vulcanization temperature of the tread rubber.

The foamed rubber is preferable to have long cells of 0.5-5 mm in length in addition to the above continuous cells, in which these long cells are arranged so as to connect with the continuous cells in a network form and/or to have an existing ratio of all bubbles contained in its interior of 10-40% as a weight ratio and HD (hardness) of 38-58.

Moreover, the term "HD (hardness)" used herein means a scale reading of a durometer hardness as measured at a testing temperature of 20° C. by a type-A durometer hardness testing machine defined in JIS K6253-1993.

The upper-layer rubber part is preferable to have a thickness corresponding to 30-70% of a thickness of the tread rubber.

The third invention is a method of producing a pneumatic tire which comprises covering one or plural resin cords arranged in parallel to each other with a foamed rubber containing a foaming agent to form a sheet-like member having a given width, winding and laminating the sheet-like member on a green case or a shaping drum along a circumferential direction of the green case or the shaping drum to form an upper-layer rubber part constituting a tread rubber and vulcanizing, during which the resin cord is melted to form a resin protection membrane and at least a part of gases produced by foaming of the foaming agent contained in the foamed rubber is sealed with the resulting resin protection membrane to form toroidally continuous cells each continuously extending substantially along a circumferential direction of the tire in the foamed rubber constituting the upper-layer rubber part.

The sheet-like member is preferable to be formed by drawing one or plural resin cords and covering such drawn resin cords with the foamed rubber through an insulation system, or by sandwiching one or plural resin cords arranged in parallel to each other between two foamed rubber sheets, or by surrounding and laminating one or plural resin cords with cord-shaped rubbers containing a foaming agent and covering with rubber through an inserter.

The fourth invention is a method of producing a pneumatic tire which comprises winding and laminating a narrow-width ribbon-shaped member of at least one resin cord covered with a foamed rubber containing a foaming agent on a green case or a shaping drum along a circumferential direction of the green case or the shaping drum to form an upper-layer rubber part constituting a tread rubber and vulcanizing, during which the resin cord is melted to form a resin protection membrane and at least a part of gases produced by foaming of the foaming agent contained in the foamed rubber is sealed with the resulting resin protection membrane to form toroidally continuous cells each continuously extending substantially along a circumferential direction of the tire in the foamed rubber constituting the upper-layer rubber part.

The ribbon-shaped member is preferable to be formed by drawing one or plural resin cords and covering such drawn resin cords with the foamed rubber through an insulation system, or by surrounding and laminating one or plural resin cords with cord-shaped rubbers containing a foaming agent and covering with rubber through an inserter.

Also, at least the upper-layer rubber part of the tread rubber is preferable to be formed by winding and laminating the ribbon-shaped member so as to overlap widthwise end portions with each other every winding while shifting in the widthwise direction of the tire.

The fifth invention is a method of producing a pneumatic tire which comprises winding and laminating a ribbon-shaped rubber sheet containing a foaming agent and resin cords on a green case or a shaping drum so as to arrange the resin cords at a given interval along a circumferential direction of the green case or the shaping drum to form an upper-layer rubber part constituting a tread rubber and vulcanizing, during which the resin cord is melted to form a resin protection membrane and at least a part of gases produced by foaming of the foaming agent contained in the foamed rubber is sealed with the resulting resin protection membrane to form toroidally continuous cells each continuously extending substantially along a circumferential direction of the tire in the foamed rubber constituting the upper-layer rubber part.

BRIEF DESCRIPTION OF THE DRAWINGS

FIG. 7 is a schematic view illustrating another forming step of the sheet-like rubber member.

BEST MODE FOR CARRYING OUT THE INVENTION

An embodiment of the first invention will be described with reference to the drawings below.

Figure 1:
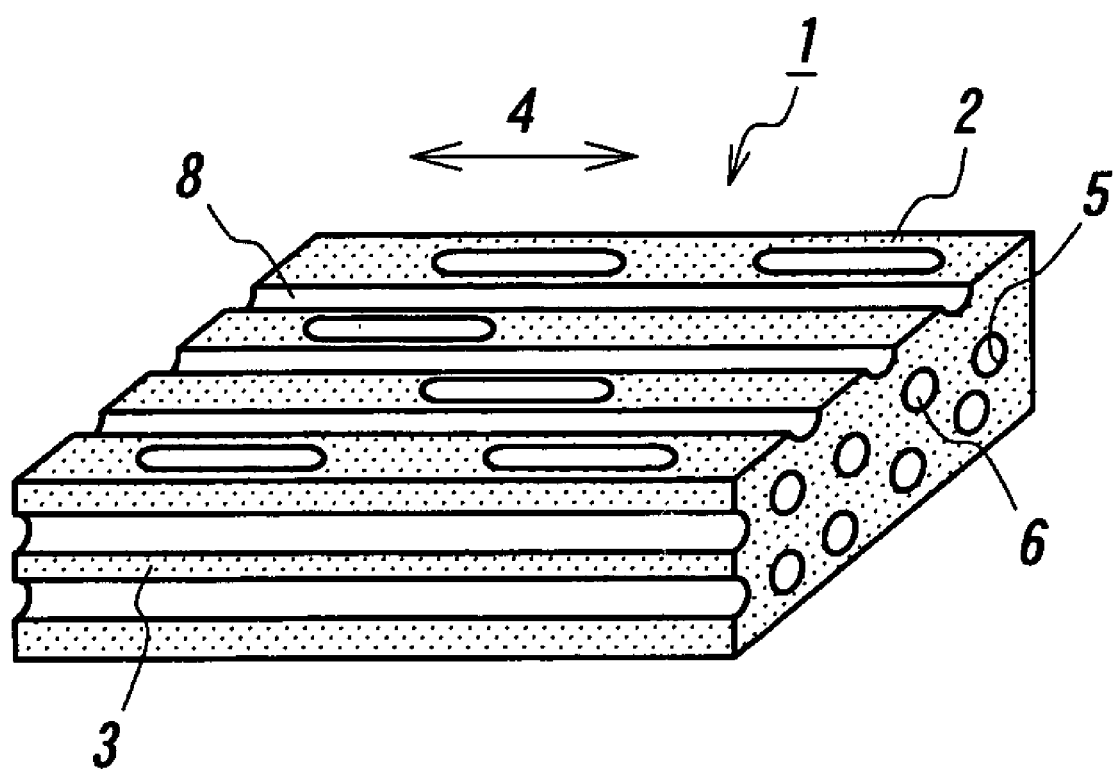
FIG. 1 is a perspective view of a rubber composition according to the first invention.
Figure 2A:
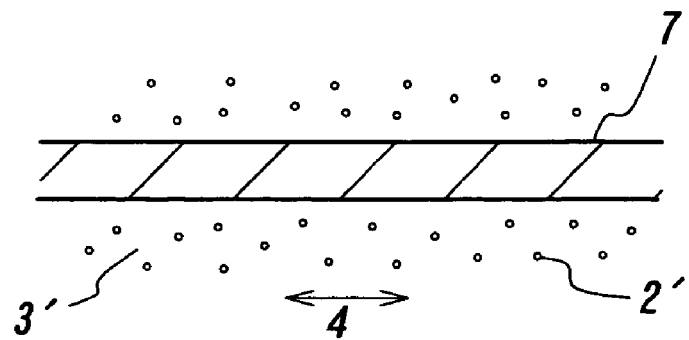
FIG. 2 is a diagrammatic view illustrating a process of forming a continuous cell in a foamed rubber constituting a rubber composition according to the first invention.
Figure 2B:
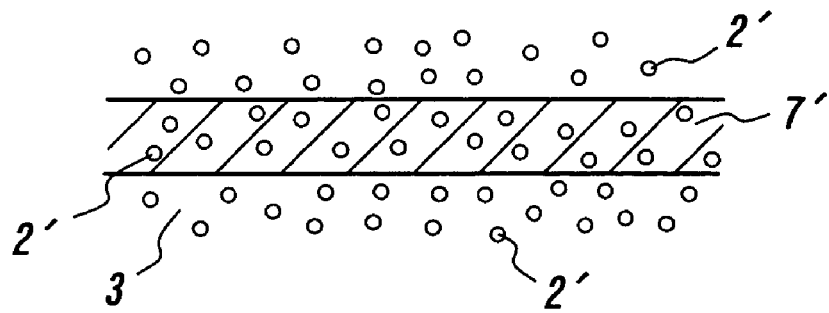
Figure 2C:
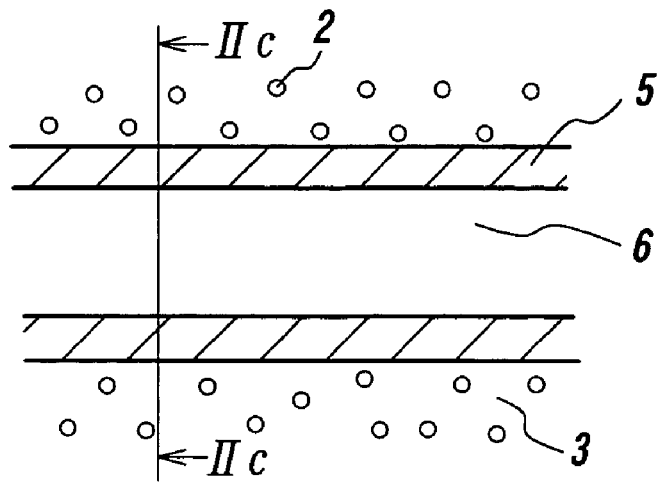
Figure 2D:
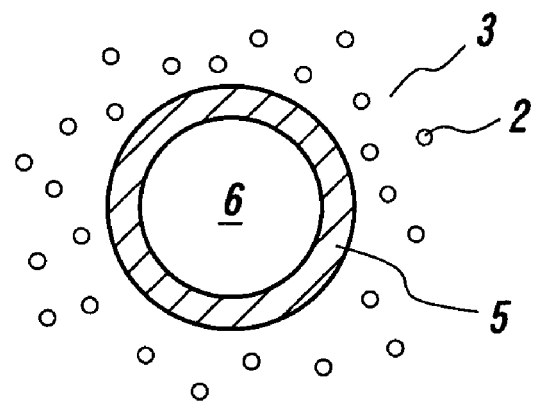

FIG. 1 shows an example of a rubber composition 1 according to the first invention.

A main feature in the construction of the rubber composition 1 according to the first invention lies in the rationalization of a bubble existing state in a foamed rubber constituting the rubber composition 1, concretely the formation of continuous cells 6 in the foamed rubber, each continuously extending substantially along a particular direction 4, a longitudinal direction of the rubber composition 1 in FIG. 1 and sealed with a resin protection membrane 5. By adopting this construction can be formed drainage paths 8 when the continuous cells 6 are opened at the ground contact face of the tread portion. As a result, when the rubber composition 1 is moved in the longitudinal direction 4 while contacting with a body having, for example, an ice face of a low friction coefficient, a large friction force is always obtained by a water removing action of the drainage path 8.

The foamed rubber constituting the rubber composition 1 is preferable to comprise resin cords 7 (see FIG. 2(*a*)) each continuously extending in a thready form along the particular direction 4 before vulcanization and a foaming agent for forming the continuous cells 6, in which the resin cord is melted in the vulcanization to develop a viscosity lower than that of rubber part constituting the foamed rubber and the foaming agent has a property of foaming in the vulcanization to produce gases, and the continuous cell 6 is formed by sealing at least a part of gases produced from the foaming agent with the resin protection membrane made of the resin cord.

FIGS. 2(*a*)-(*d*) are views illustrating a process of forming the continuous cell 6 in the foamed rubber.

FIG. 2(*a*) shows a state of the foamed rubber when the heating of the foamed rubber is started in a mold (not shown). The foaming agent in the foamed rubber is gasified by the heating to start the generation of bubbles 2'.

Then, as the foamed rubber is further heated to a higher temperature (e.g. a maximum vulcanization temperature), a resin cord 7 is melted (or softened) and a viscosity thereof is made lower than a viscosity of a rubber part 3. As a result, the bubbles 2' generated around the resulting molten resin 7' are effectively entered into the molten resin 7' as shown in FIG. 2(*b*).

Thereafter, the bubbles 2' entered into the molten resin 7' are connected to each other in a chain in the molten resin 7' and finally sealed with a resin protection membrane 5 made of the molten resin 7' to form a continuous cell 6. On the other hand, the bubbles 2' generated apart from the molten resin 7' in the rubber part 3' settle on their positions at a state of a spherical closed cell 2.

As a result, the spherical closed cells 2 and the continuous cells 6 reinforced with the resin protection membranes 5 can be formed in the foamed rubber constituting the rubber composition 1 of the first invention as shown in FIGS. 2(*c*) and 2(*d*).

An embodiment of the second invention will be described below.

Figure 3:
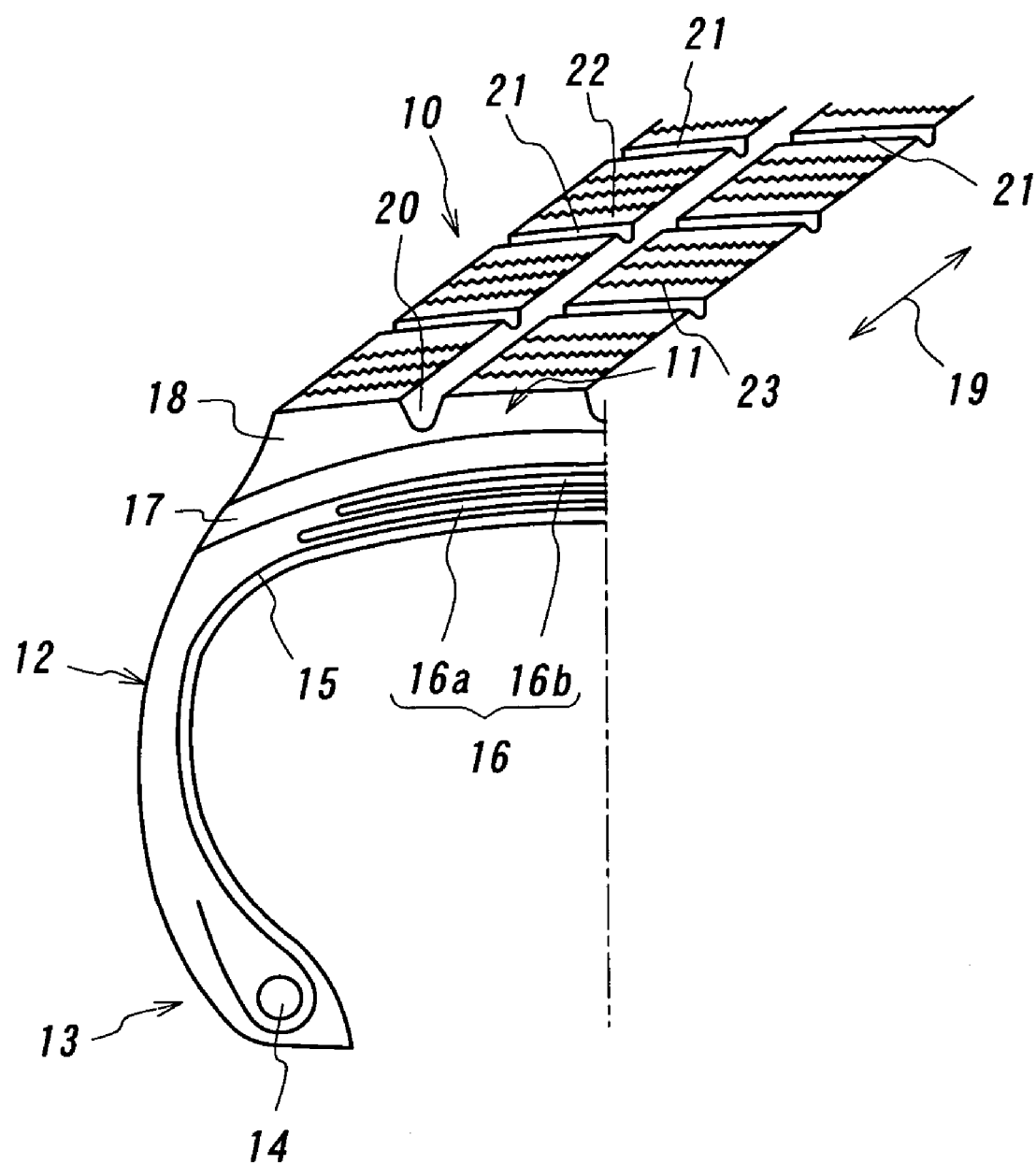
FIG. 3 is a perspective view of a widthwise half-section of a pneumatic tire according to the second invention together with a ground contact face of its tread portion.

FIG. 3 shows a widthwise left-half section of a pneumatic tire 10 according to the second invention.

The illustrated pneumatic tire 10 is a studless tire and comprises a tread portion 11, a pair of sidewall portions 12, a pair of bead portions 13, a carcass 15 of one ply toroidally extending between a pair of bead cores 14 each embedded in the bead portion 13 and fixed at both end portions around the bead core, and a belt 16 of two rubberized cord layers 16*a*, 16*b* arranged between a crown portion of the carcass and the tread portion 11.

Also, the tread portion 11 is made of two layers, i.e. a lower-layer rubber part 17 made of a relatively hard rubber and an upper-layer rubber part 18 applied with the same foamed rubber as the rubber composition according to the first invention.

Further, plural tread grooves, i.e. tread grooves having plural circumferential grooves 20 extending along a circumferential direction 19 of the tire and plural lateral grooves 21 intersecting therewith in FIG. 3 are arranged on the tread portion 11, whereby a tread land portion is divided into a plurality of block land parts 22. Further, a plurality of sipes 23 are arranged on each of the block land parts 22 as an edge component for ensuring performances on an ice-snow road surface.

Moreover, the term "tread groove" used herein includes all grooves arranged on the tread portion 11. For example, there are mentioned slant grooves (not shown) inclined with respect to the circumferential direction 19 of the tire and the like in addition to the aforementioned circumferential grooves 20 and lateral grooves 21.

A main feature in the construction of the pneumatic tire 10 according to the second invention lies in that the upper-layer rubber part 18 is made of the rubber composition 1 shown in FIG. 1, more concretely the upper-layer rubber part 18 has the continuous cells 6 each continuously extending substantially along the circumferential direction 19 of the tire and sealed with the resin protection membrane 5. By adopting this construction can be enhanced the gripping force on a frozen road surface or a snow covered road surface to improve steering stability performances such as braking performance, cornering performance and the like.

Figure 4A:
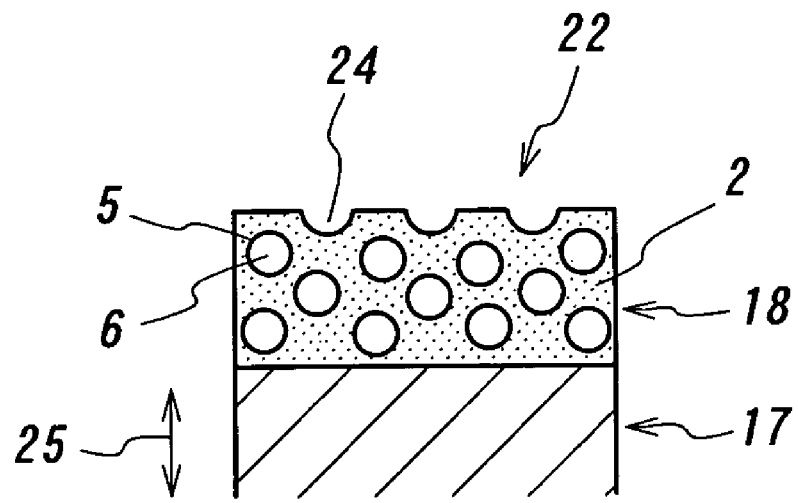
FIG. 4 shows one of block land portions formed in the tread portion of the tire of FIG. 3, wherein (a) is a widthwise section view and (b) is a perspective view.
Figure 4B:
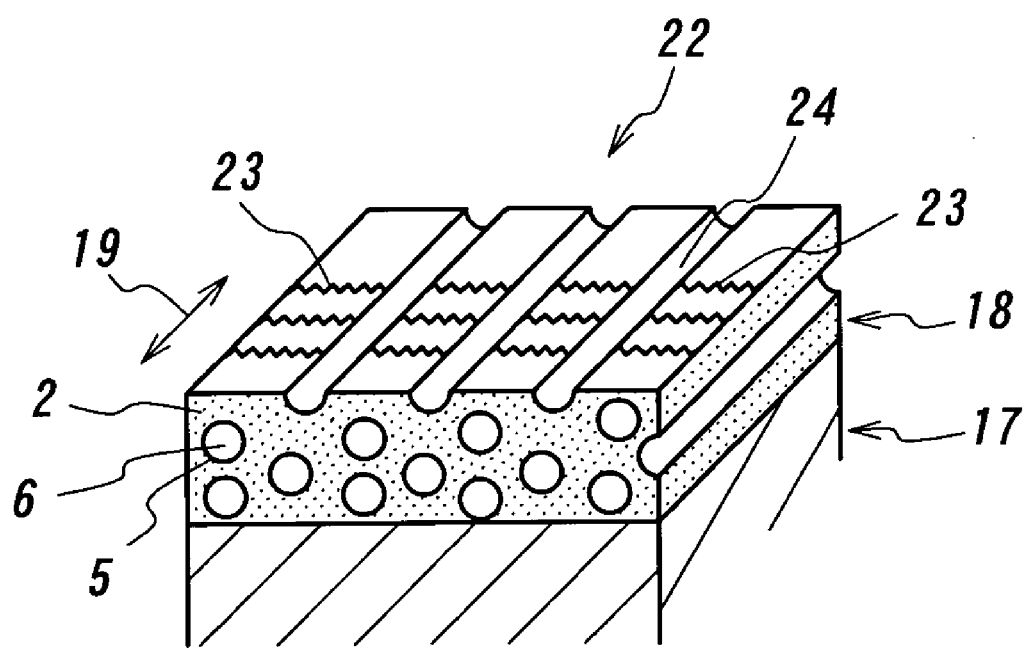

FIGS. 4(*a*), (*b*) show one of the block land parts 22 constituting the tread portion worn by the running, wherein (a) is a widthwise section view and (b) is a perspective view. Moreover, the tire 10 has a toroidal form, so that the continuous cells 6 are toroidally extended substantially along the circumferential direction 19 of the tire.

As seen from these figures, drainage paths 24 extending in the circumferential direction 19 of the tire are always formed on the ground contact face of the tread portion in the tire 10 by opening the continuous cells 6 each sealed with the resin protection membrane 5 through the wearing of the tread. Furthermore, these drainage paths 24 communicate with the plural lateral grooves 21 defining the block land part and also communicate with the plural sipes 23 arranged in the same block land part, so that there can be obtained good water removing effect.

It is preferable that the foamed rubber comprises resin cords 7 continuously extending in a thready form along the circumferential direction 19 of the tire before vulcanization and a foaming agent for forming the continuous cells 6, in which the resin cord 7 is melted in the vulcanization to develop a viscosity lower than that of rubber part 3' constituting the foamed rubber and the foaming agent has a property of foaming in the vulcanization to produce gases, and the continuous cell 6 is formed by sealing at least a part of gases produced from the foaming agent with the resin protection membrane 5 made from the resin cord 7 (see FIG. 2).

Also, it is preferable that the resin cords 7 are arranged in a density of about one cord/1 mm for the purpose of removing water in the circumferential direction 19 of the tire. In addition, a cord diameter of the resin cord is preferable to be 10-100 μm in view of the securement of actual contact area.

Further, the continuous cells 6 are preferable to be arranged regularly or randomly at plural stages in not only the widthwise direction of the tire but also the thickness direction of the tread as shown in FIGS. 4(*a*) and (*b*). By arranging the continuous cells 6 as mentioned above, the drainage paths 24 can be always existent on the ground contact face of the tread portion in the wearing.

Figure 5:
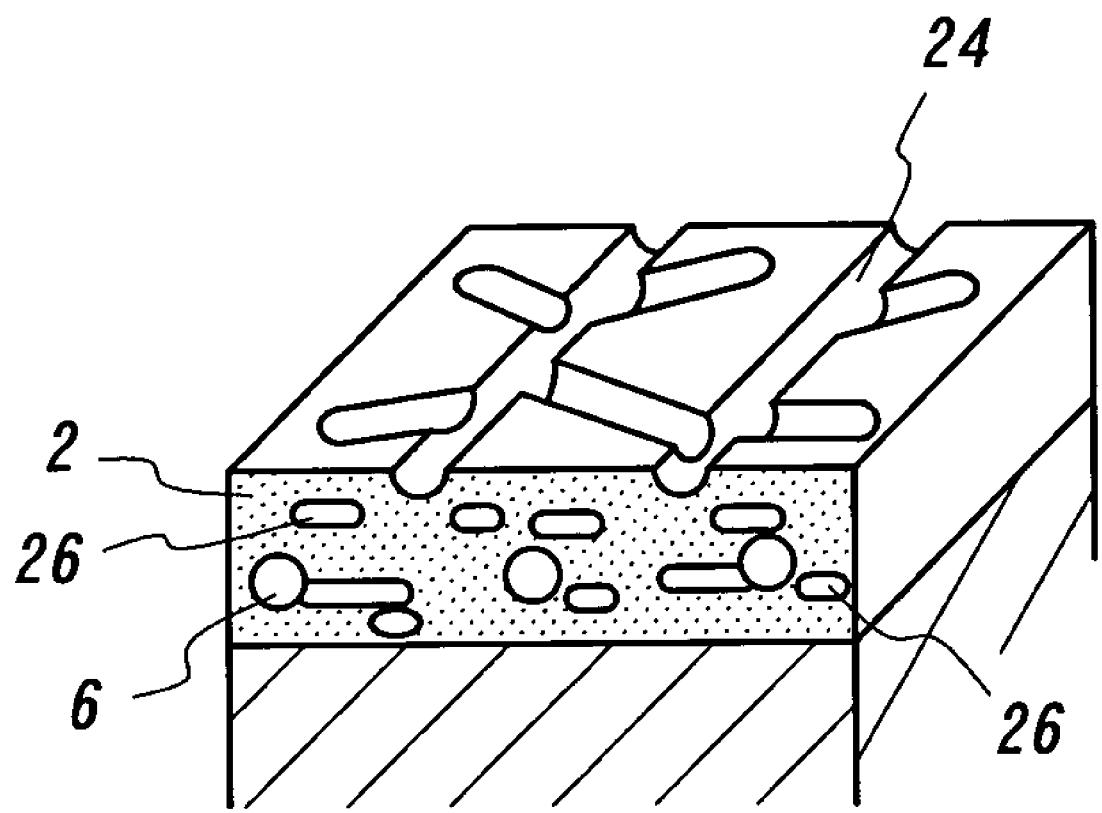
FIG. 5 is a view of another embodiment of the block land portion.

The upper-layer rubber part 18 is preferable to have long cells 26 of 0.5-5 mm in length in addition to the above continuous cells 6, in which these long cells 26 are arranged so as to connect with the continuous cells 6 in a network form as shown in FIG. 5 in view of the shortening of the time required in the drainage or the increase of the drainage efficiency.

Figure 10:
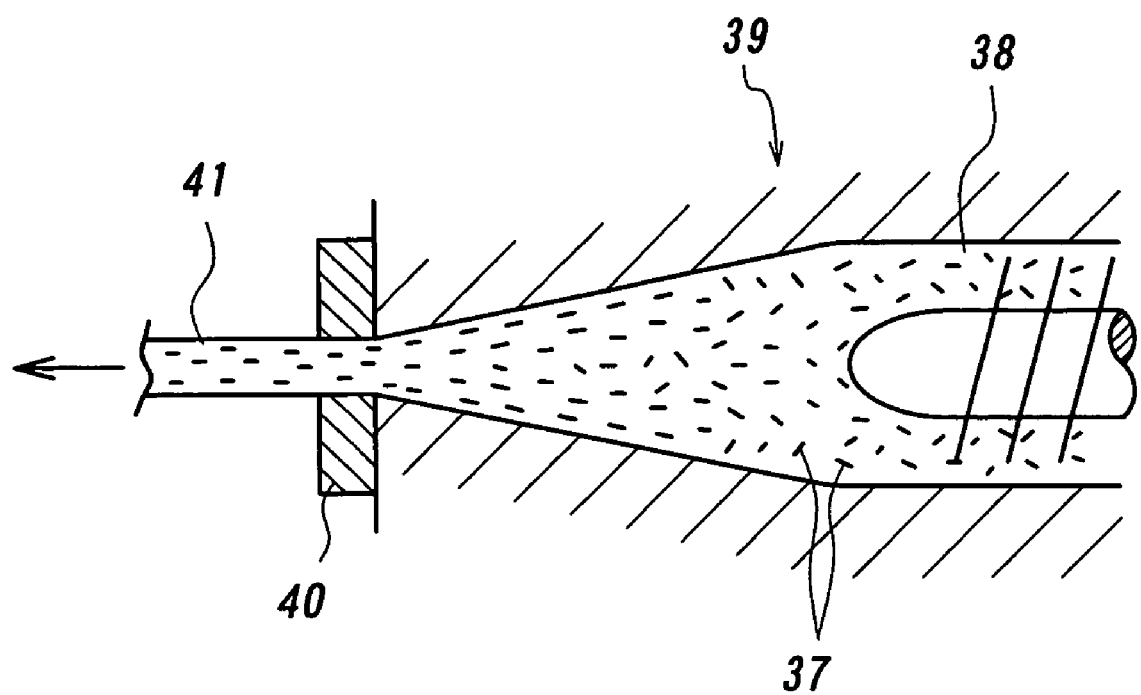
FIG. 10 is a diagrammatic view illustrating a method of forming a long cell.

Moreover, as a way for forming the long cells 26 in the upper-layer rubber part 18, it is preferable to use a method wherein long resin pieces 37 are kneaded with an uncured rubber composition 38 in an extruder 39 and a kneaded mass is extruded through a die 40 of the extruder into a given shape as shown in FIG. 10 and then the resulting sheet-shaped rubber member 41 is used as a starting material for the upper-layer rubber part 18 and thereafter foamed through vulcanization.

The resin cord is required to have a melting point lower than a maximum vulcanization temperature of the tread rubber itself because it forms the resin protection membrane 5 sealing the continuous cell 6 therein in a tire product. The melting point is made preferably by 10° C. or less, particularly 30° C. or less than the maximum vulcanization temperature.

That is, when the difference between the melting point of the resin cord 7 and the maximum vulcanization temperature is too small, the melting of the resin cord 7 starts at a last stage of the vulcanization and the rubber part already takes a greater amount of gases therein to promote cross-linking reaction and hence an amount of gas captured in the molten resin cord becomes small and the formation of the continuous cell 6 is difficult, while when the difference between the melting point of the resin cord 7 and the maximum vulcanization temperature is too large (concretely the melting point of the resin cord is low), the resin cords 7 are melted by heat in the kneading of rubber and the fusion bonding between the molten resin cords 7' is caused at this kneading stage and it is difficult to extend the continuous cells 6 along the circumferential direction 19 of the tire.

The term "maximum vulcanization temperature of tread rubber itself" used herein means a maximum temperature of the tread portion in the vulcanization inside a mold for a period ranging up to the cooling of the tire outside the mold.

Also, the upper-layer rubber part 18 is preferable to have a thickness corresponding to 30-70%, more preferably 40-55% of a thickness of the tread rubber. When the thickness of the upper-layer rubber part 18 is less than 30% of the thickness of the tread rubber, the foamed rubber constituting the upper-layer rubber part 18 becomes not existent at the last use stage of the tire and it is difficult to ensure the stable performances on ice-snow road in the service life of the tire, while when it exceeds 70%, the rigidity of the tread portion is apt to be lacking and there is caused a fear that the steering stability in usual running (running on dry road surface) can not be sufficiently ensured.

Furthermore, the foamed rubber constituting the upper-layer rubber part 18 is preferable that an existing ratio of all bubbles contained therein is a range of 10-40% as a weight ratio and HD is 38-58. When the existing ratio of all bubbles contained in the interior of the foamed rubber is less than 10% as a weight ratio, the drainage efficiency lowers, while when it exceeds 40%, the wear resistance and the performances on ordinary road are deteriorated. Also, when HD of the foamed rubber is less than 38, the wear resistance and the performances on ordinary road are deteriorated, while when it exceeds 58, the tire hardly follows to micro-irregularities on ice road.

In addition, the continuous cell 6 is preferable to have a sectional diameter of 10-200 μm. When the sectional diameter is less than 10 μm, the drainage efficiency is insufficient, while it exceeds 200 μm, the actual contact area lowers and hence the friction coefficient on ice lowers.

The production method of the pneumatic tire according to the third to fifth inventions will be described below.

At first, the method of forming the upper-layer rubber part 18 according to the third invention is explained. In the third invention, one or plural resin cords are arranged in parallel and covered with foamed rubber containing a foaming agent to form a sheet-like member having a given width. The term "given width" used herein means the same width as a tread rubber.

Figure 6A:
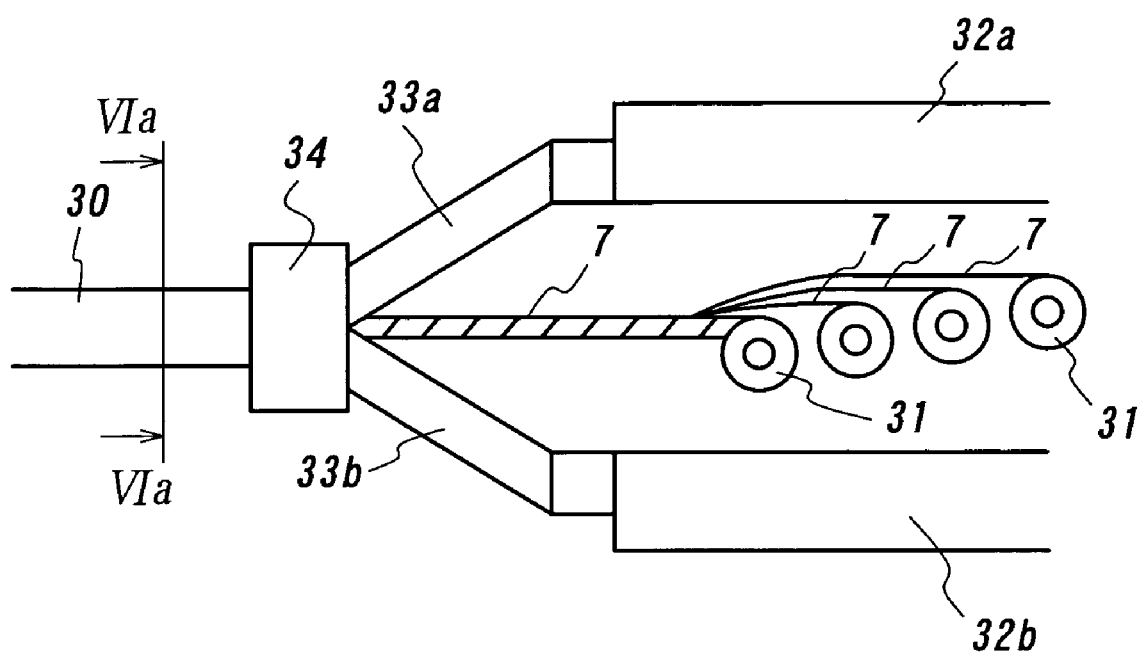
FIG. 6 is a schematic view illustrating a forming step of a sheet-like rubber member in the production method according to the third invention.
Figure 6B:
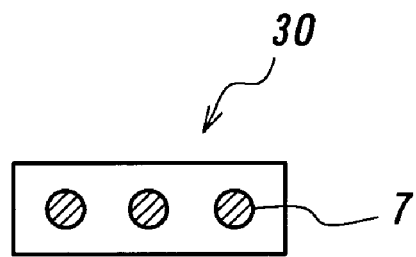

FIG. 6(a) shows an example of a method of forming a sheet-like member 30.

This figure shows a case that one or plural resin cords 7 are drawn out from a respective bobbin(s) 31 and the drawn resin cords 7 are arranged in parallel and covered with foamed rubbers 33a, 33b extruded through two rubber extruders 32a, 32b through an insulation system, which is then passed through an inserter 34 to integrally unite the resin cords 7 and the foamed rubbers 33a, 33b with each other to thereby form a sheet-like member 30. Also, the sheet-like member 30 may be formed by covering the resin cords 7 through a single rubber extruder. The formation method of the sheet-like member 30 is not limited to the above and various formation methods can be adopted.

For example, when the resin cord is made from a frangible material or the like, as shown in FIG. 7, the sheet-like member 30 is preferable to be formed by placing resin cords 7A, 7B, 7C . . . having a length equal to a peripheral length of a green case extruded through an extruding machine 42 on a foamed rubber sheet 33b side by side and placing another foamed rubber sheet 33a thereon to sandwich the resin cords 7A, 7B, 7C . . . between the foamed rubber sheets 33a, 33b.

Figure 8:
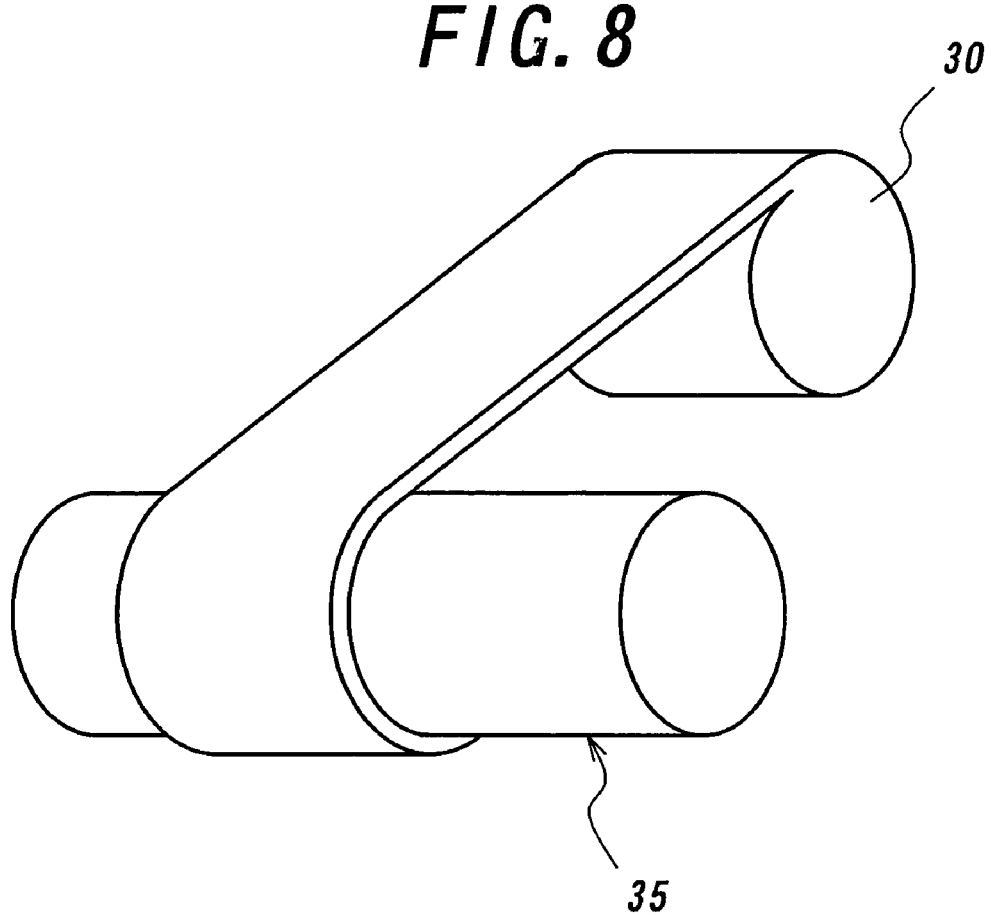
FIG. 8 is a schematic view illustrating a state of winding and laminating a sheet-like rubber member on a shaping drum in the production method according to the third invention.

Then, the sheet-like member 30 is wound and laminated on a green case or a shaping drum, which is previously wound and laminated with a rubber sheet constituting a lower-layer rubber part 17, a shaping drum 35 in FIG. 8 so as to extend the resin cords 7 embedded in the sheet-like member 30 along a circumferential direction of the shaping drum 35 to thereby form the upper-layer rubber part 18.

The method of forming the upper-layer rubber part 18 in the production method of the fourth invention will be described below. In the fourth invention, the upper-layer rubber part 18 is formed by using a narrow-width ribbon-shaped member obtained by covering at least one resin cord with a foamed rubber containing a foaming agent.

Figure 11:
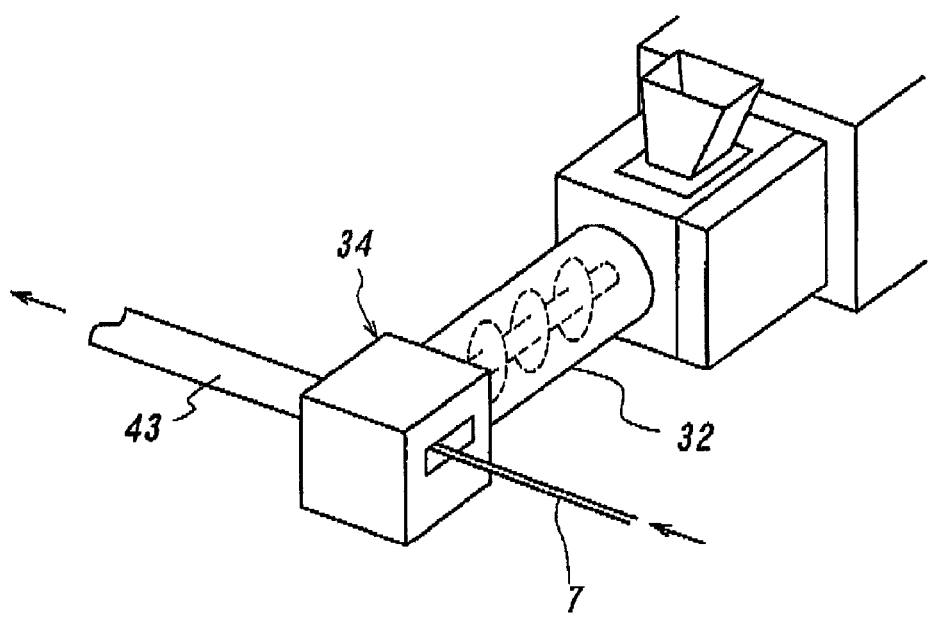
FIG. 11 is a schematic view illustrating a forming step of a narrow-width ribbon-shaped rubber member in the production method according to the fourth invention.

FIG. 11 is a view illustrating an example of the method of forming a ribbon-shaped member 43.

In this figure, one resin cord 7 is covered with a foamed rubber extruded from a rubber extruder 32 through an insulation system and passed through an inserter 34 to cover the resin cord 7 with the foamed rubber to thereby form a ribbon-shaped member 43.

Figure 12A:
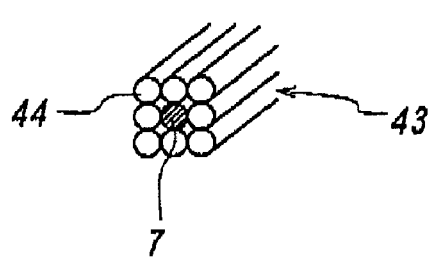
FIG. 12 is a schematic view illustrating a method of forming a ribbon-shaped member by using a resin cord and a cord-shaped rubber.
Figure 12B:
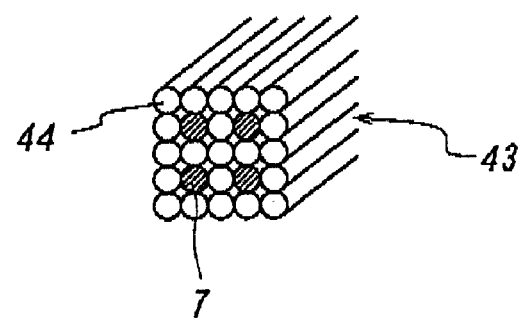

Also, the ribbon-shaped member 43 may be formed by laminating plural cord-shaped rubbers 44 containing a foaming agent around one resin cord 7 and passing through the inserter to cover the resin cord 7 with rubber as shown in FIG. 12(a), or by laminating plural cord-shaped rubbers 44 containing a foaming agent around each of plural resin cords 7 and passing through the inserter to cover the resin cords 7 with rubber as shown in FIG. 12(b).

Then, the ribbon-shaped member 43 is wound and laminated on a green case or a shaping drum, which is previously wound and laminated with a rubber sheet constituting a lower-layer rubber part 17, so as to extend the resin cords 7 embedded in the ribbon-shaped member 43 along a circumferential direction of the shaping drum to thereby form the upper-layer rubber part 18.

Figure 9:
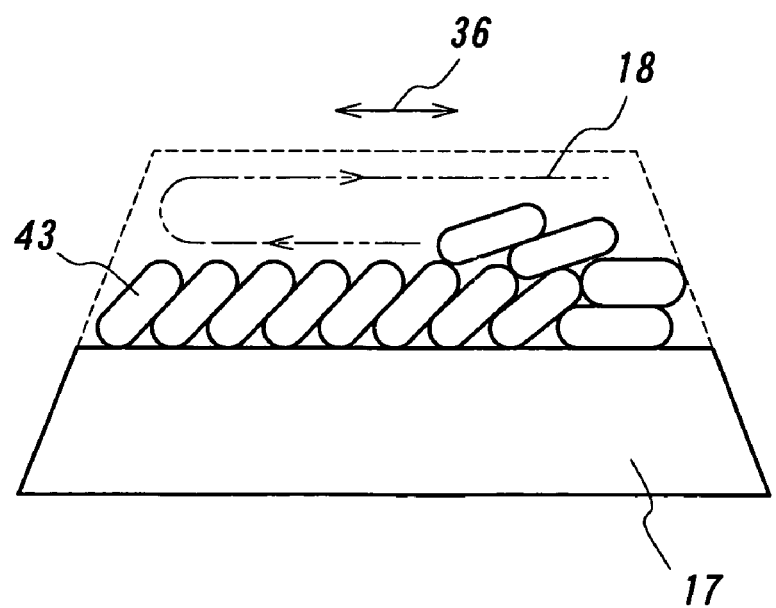
FIG. 9 is a schematic view illustrating a method of forming an upper-layer rubber part by using a narrow-width ribbon-shaped rubber member.

In the fourth invention, as shown in FIG. 9, at least the upper-layer rubber part 18 of the tread rubber may be formed by winding and laminating the ribbon-shaped member 43 so as to overlap width end portions with each other every winding while shifting in the widthwise direction 36 of the tire. According to this forming method, the continuous cells 6 can be effectively arranged in not only the widthwise direction of the tread but also the thickness direction of the tread, so that as the tire is worn, the drainage paths 24 formed by opening the continuous cells 6 can be always existent in the ground contact face of the tread portion 11 and hence the lowering of the performances on ice-snow during the wearing can be suppressed.

Such an effect can also be obtained even by using the sheet-like member according to the third invention instead of the ribbon-shaped member.

The method of forming the upper-layer rubber part 18 according to the fifth invention will be described below.

Figure 13A:
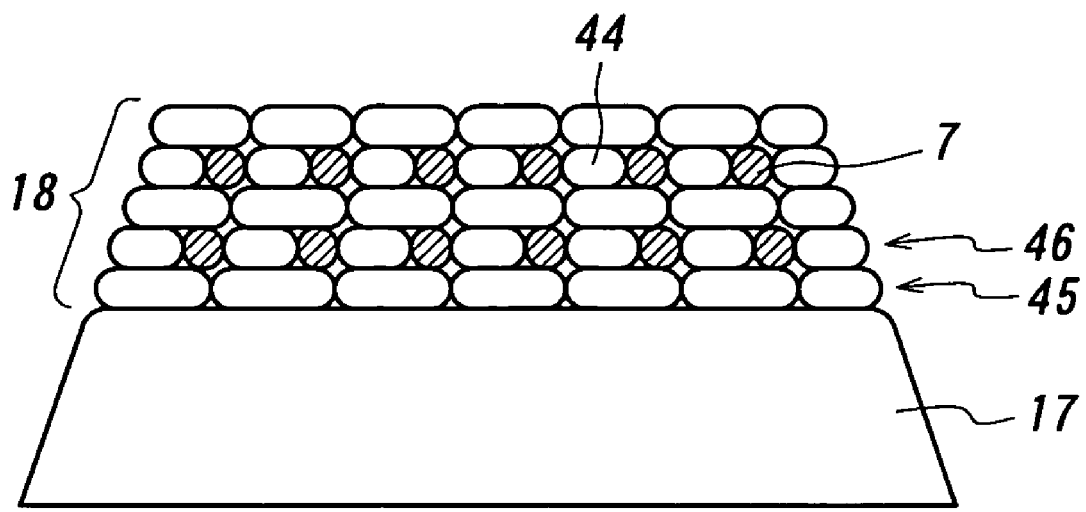
FIG. 13 is a schematic view illustrating a method of forming an upper-layer rubber part according to the fifth invention.
Figure 13B:
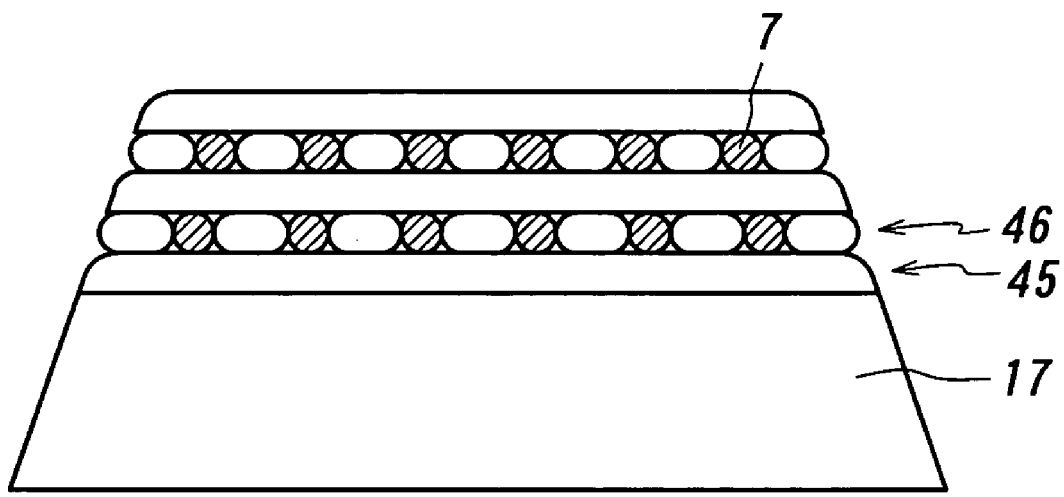

As shown in FIG. 13(a), a cord-shaped rubber 44 is wound on the lower-layer rubber part 17 while shifting in the widthwise direction 36 of the tire to form a single rubber layer 45. Then, plural resin cords 7 and the cord-shaped rubber 44 are wound on t he single rubber layer 45 so as to arrange the resin cords 7 at given intervals to form a cord-rubber layer 46. The single rubber layer 45 and the cord-rubber layer 46 are successively laminated to obtain a given thickness to thereby form the upper-layer rubber part 18. Moreover, this figure shows a case that the single rubber layer 45 is formed with the plural cord-shaped rubbers 44, but the single rubber layer 45 may be constituted with a single wide-width rubber sheet as shown in FIG. 13(b).

When the upper-layer rubber part 18 formed according to any one of the third to fifth inventions is used to form a green tire and then subjected to vulcanization, the resin cords 7 in the foamed rubber constituting the upper-layer rubber part of the tire tread are melted to form the resin protection membrane 5 and at the same time at least a part of gases produced by foaming the foaming agent contained in the foamed rubber is sealed with the rein protection membrane 5, whereby there can be formed the continuous cells 6 each continuously extending substantially along the circumferential direction 19 of the tire.

Although the above is merely described with respect to the embodiment of the invention, various modifications can be conducted within the scope of the invention.

Then, the studless tire according to the second invention is prepared by the method according to the third invention applying the rubber composition according to the first invention to the upper-layer rubber part and the performances thereof are evaluated below.

EXAMPLES

Tires of Examples 1-9 are studless radial tires each having a half section in a widthwise direction of the tire shown in FIG. 3 and a tire size of 205/65R15, in which continuous cells are arranged in an upper-layer rubber part at 5 stages and 30 rows with an interval of 1 mm and a thickness of the upper-layer rubber part is 45% of a thickness of a tread rubber and an existing ratio of all bubbles contained in an interior of a foamed rubber constituting the upper-layer rubber part as a weight ratio and HD of the foamed rubber are shown in Table 1. Moreover, the upper-layer rubber part is formed by winding and laminating a narrow-width ribbon-shaped member having a thickness of 0.5 mm and a width of 10 mm so as to overlap widthwise end portion with each other every winding while shifting in the widthwise direction of the tire as shown in FIG. 9. Also, the resin cords are arranged in the ribbon-shaped member at a density of 1.5 cords/1 mm. The resin cord embedded in the ribbon-shaped member before vulcanization has a cord diameter of 30 μm and a melting point of 140° C., which is lower by about 30° C. than a maximum vulcanization temperature of the tread rubber itself.

Moreover, the other construction of the tire is substantially the same as in the ordinary pneumatic radial tire for a passenger car.

Conventional Example

The tire of Conventional Example is the same as the tire of Example 1 except that the foamed rubber constituting the upper-layer rubber part has an expansion ratio of 26% as a weight ratio of rubber, HD of 48 and a thickness corresponding to 45% of a whole of a tread and the continuous cells are not formed.

(Test Method)

Each of the above tires is assembled into a rim of 6.5J×15 to form a tire-rim assembly, which is mounted onto a passenger car. Such a passenger car is run on various road surfaces (dry road surface, wet road surface, frozen road surface, snow covered road surface) to evaluate braking performances on the frozen road surface and snow covered road surface, and steering stability performances on the dry road surface and wet road surface. In this case, a tire internal pressure is 190 kPa in front and rear tires, and a load corresponds to two crewmen.

The braking performance is evaluated by measuring a stopping distance when quick braking (full braking) is applied from a speed of 20 km/h on the frozen road surface or 40 km/h on the snow covered road surface at an OFF state of ABS (anti-lock braking system).

The steering stability performance is evaluated by measuring an average time every running when the tire is run on a circuit course 10 times.

These evaluation results are also shown in Table 1. Moreover, the numerical values in Table 1 is represented by an index on the basis that the conventional example is 100, in which the larger the numerical value, the better the performance.

TABLE 1

| | Conventional Example | Example | | | | | | | | |
|---|---|---|---|---|---|---|---|---|---|---|
| | | 1 | 2 | 3 | 4 | 5 | 6 | 7 | 8 | 9 |
| HD | 48 | 48 | 43 | 53 | 35 | 65 | 48 | 48 | 48 | 48 |
| Weight ratio of foamed rubber | 26% | 26% | 26% | 26% | 26% | 26% | 16% | 36% | 5% | 50% |
| A. Braking performance *1 | 100 | 110 | 112 | 108 | 115 | 103 | 105 | 115 | 100 | 120 |
| B. Braking performance *2 | 100 | 107 | 109 | 105 | 112 | 100 | 102 | 112 | 97 | 117 |
| C. Steering stability performance *3 | 100 | 102 | 101 | 103 | 99 | 105 | 104 | 100 | 106 | 97 |

TABLE 1-continued

|  | Conventional Example | Example | | | | | | | | |
|---|---|---|---|---|---|---|---|---|---|---|
|  |  | 1 | 2 | 3 | 4 | 5 | 6 | 7 | 8 | 9 |
| D. Steering stability performance *4 | 100 | 101 | 100 | 102 | 98 | 104 | 103 | 99 | 105 | 96 |

(Note)
*1: on frozen road surface
*2: on snow covered road surface
*3: on dry road surface
*4: on wet road surface As seen from the evaluation results of Table 1, the example tires are equal level in the steering stability performance on the dry and wet road surfaces but are considerably excellent in the braking performances on the frozen and snow covered road surfaces as compared with the conventional tire.

INDUSTRIAL APPLICABILITY

According to the invention, there can be provided a rubber composition providing a large friction force even on a body having, for example, an ice face of a low friction coefficient by constituting with a foamed rubber having a rationalized foaming state, and a pneumatic tire, particularly a winter-seasoned tire such as a studless tire having improved steering stability performances such as braking performance, cornering performance and the like by applying this rubber composition to an upper-layer rubber part of a tread rubber constituting at least a ground contact face to enhance a gripping force on a frozen road surface or a snow covered road surface as well as a method of producing such a tire.

The invention claimed is:

1. A pneumatic tire comprising a tread rubber in a tread portion including grooves and sipes, at least an upper-layer rubber part of which forming a ground contact face being made of a foamed rubber, characterized in that the upper-layer rubber part has toroidally continuous cells each continuously extending substantially along a circumferential direction of the tire and sealed with a resin protection membrane and having a length longer than an arranging pitch of the sipes or grooves and a sectional diameter of 10-200 μm.

2. A pneumatic tire according to claim 1, wherein the continuous cells are arranged at plural stages in a thickness direction of a tread.

3. A pneumatic tire according to claim 1, wherein the foamed rubber comprises resin cords each continuously extending in a thready form along the circumferential direction of the tire before vulcanization and a foaming agent, in which the resin cord is melted in the vulcanization to develop a viscosity lower than that of rubber constituting the upper-layer rubber part and the foaming agent has a property of foaming in the vulcanization to produce gases, and the continuous cell is formed by sealing at least a part of gases produced from the foaming agent with the resin protection membrane made of the resin cord.

4. A pneumatic tire according to claim 3, wherein the resin cord has a cord diameter of 10-100 μm.

5. A pneumatic tire according to claim 3, wherein the resin cord has a melting point lower than a maximum vulcanization temperature of the tread rubber.

6. A pneumatic tire according to claim 1, wherein the foamed rubber has long cells of 0.5-5 mm in length in addition to the continuous cells, in which these long cells are arranged so as to connect with the continuous cells in a network form.

7. A pneumatic tire according to claim 1, wherein the foamed rubber has an existing ratio of all bubbles contained in its interior of 10-40% as a weight ratio of the foamed and unfoamed rubber, and HD (hardness) of 38-58.

8. A pneumatic tire according to claim 1, wherein the upper-layer rubber part has a thickness corresponding to 30-70% of a thickness of the tread rubber.

9. A method of producing a pneumatic tire which comprises covering one or plural resin cords arranged in parallel to each other with a foamable rubber containing a foaming agent to form a sheet-like member having a given width, winding and laminating the sheet-like member on a green case or a shaping drum along a circumferential direction of the green case or the shaping drum to form an upper-layer rubber part constituting a tread rubber and vulcanizing to form foamed tread rubber including grooves and sipes, during which the resin cord is melted to form a resin protection membrane and at least a part of gases produced by foaming of the foaming agent contained in the foamable rubber is sealed with the resulting resin protection membrane to form toroidally continuous cells each continuously extending substantially along a circumferential direction of the tire in the foamed rubber constituting the upper-layer rubber part, the cells having a length longer than an arranging pitch of the sipes or grooves and a sectional diameter of 10-200 μm.

10. A method of producing a pneumatic tire which comprises winding and laminating a narrow-width ribbon-shaped member of at least one resin cord covered with a foamable rubber containing a foaming agent on a green case or a shaping drum along a circumferential direction of the green case or the shaping drum to form an upper-layer rubber part constituting a tread rubber and vulcanizing to form foamed tread rubber including grooves and sipes, during which the resin cord is melted to form a resin protection membrane and at least a part of gases produced by foaming of the foaming agent contained in the foamable rubber is sealed with the resulting resin protection membrane to form toroidally continuous cells each continuously extending substantially along a circumferential direction of the tire in the foamed rubber constituting the upper-layer rubber part, the cells having a length longer than an arranging pitch of the sipes or grooves and a sectional diameter of 10-200 μm.

11. A method of producing a pneumatic tire according to claim 9, wherein the member is formed by drawing one or plural resin cords and covering such drawn resin cords with the foamable rubber through an insulation system.

12. A method of producing a pneumatic tire according to claim 9, wherein the member is formed at least in part by laminating one or plural resin cords with narrow strips of rubber containing a foaming agent.

13. A method of producing a pneumatic tire according to claim 9, wherein the member is formed by sandwiching one or plural resin cords arranged in parallel to each other between two foamable rubber sheets.

14. A method of producing a pneumatic tire according to claim 10, wherein at least an upper-layer rubber part of the tread rubber is formed by winding and laminating the ribbon-shaped member so as to overlap widthwise end portions with each other every winding while shifting in a widthwise direction of the tire.

15. A method of producing a pneumatic tire which comprises winding and laminating a ribbon-shaped rubber sheet containing a foaming agent and resin cords on a green case or a shaping drum so as to arrange the resin cords at a given interval along a circumferential direction of the green case or the shaping drum to form an upper-layer rubber part constituting a tread rubber and vulcanizing to form foamed tread rubber including grooves and sipes, during which the resin cord is melted to form a resin protection membrane and at least a part of gases produced by foaming of the foaming agent contained in the foamable rubber is sealed with the resulting resin protection membrane to form toroidally continuous cells each continuously extending substantially along a circumferential direction of the tire in the foamed rubber constituting the upper-layer rubber part, the cells having a length longer than an arranging pitch of the sipes or grooves and a sectional diameter of 10-200 $\mu$m.

* * * * *